US011955066B2

(12) United States Patent
Yang et al.

(10) Patent No.: US 11,955,066 B2
(45) Date of Patent: Apr. 9, 2024

(54) SOURCE DRIVER AND DISPLAY DEVICE INCLUDING THE SAME

(71) Applicant: Samsung Display Co., LTD., Yongin-si (KR)

(72) Inventors: Jin-Wook Yang, Yongin-si (KR); Sehyuk Park, Yongin-si (KR); Donggyu Lee, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/132,242

(22) Filed: Apr. 7, 2023

(65) Prior Publication Data

US 2024/0038143 A1 Feb. 1, 2024

(30) Foreign Application Priority Data

Jul. 27, 2022 (KR) ........................ 10-2022-0093474

(51) Int. Cl.
*G09G 3/32* (2016.01)

(52) U.S. Cl.
CPC ....... *G09G 3/32* (2013.01); *G09G 2310/0267* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 11,250,762 | B2 | 2/2022 | Nam et al. |
| 2019/0355307 | A1 | 11/2019 | Nam et al. |
| 2020/0243008 | A1 | 7/2020 | Lee et al. |

FOREIGN PATENT DOCUMENTS

| | | | |
|---|---|---|---|
| KR | 1020190133083 | A | 12/2019 |
| KR | 1020200093745 | A | 8/2020 |
| KR | 1020210081959 | A | 7/2021 |
| KR | 1020210112442 | A | 9/2021 |

*Primary Examiner* — Duane N Taylor, Jr.
(74) *Attorney, Agent, or Firm* — CANTOR COLBURN LLP

(57) ABSTRACT

A display device includes: a display panel which displays an image corresponding to each of a plurality of frames, and a source driver which drives the display panel. The plurality of frames includes a first frame operating at a first operating frequency, and a second frame operating at a frequency higher than the first operating frequency. The first frame includes a write cycle section, a hold cycle section, and a blank section including a standby section. The source driver operates in a normal driving mode during the write cycle section and the hold cycle section, and operates in a low-power driving mode during the standby section.

20 Claims, 8 Drawing Sheets

SOURCE DRIVER AND DISPLAY DEVICE INCLUDING THE SAME

This application claims priority to Korean Patent Application No. 10-2022-0093474, filed on Jul. 27, 2022, and all the benefits accruing therefrom under 35 U.S.C. § 119, the content of which in its entirety is herein incorporated by reference.

BACKGROUND

Embodiments of the present disclosure described herein relate to a source driver with reduced power consumption, and more particularly, relate to a display device including the same.

A light emitting display device among display devices displays an image by using a light emitting diode that generates a light through the recombination of electrons and holes. The light emitting display device has a fast response speed and operates with low power consumption. The light emitting display device includes pixels connected to data lines and scan lines. Each of the pixels generally includes a light emitting diode, and a pixel circuit for controlling the amount of current flowing to the light emitting diode.

SUMMARY

Embodiments of the present disclosure provide a source driver having reduced power consumption and a display device including the same.

According to an embodiment, a display device includes: a display panel which displays an image corresponding to each of a plurality of frames, and a source driver which drives the display panel. The plurality of frames includes a first frame operating at a first operating frequency, and a second frame operating at a frequency higher than the first operating frequency. The first frame includes a write cycle section, a hold cycle section, and a blank section including a standby section. The source driver operates in a normal driving mode during the write cycle section and the hold cycle section, and operates in a low-power driving mode during the standby section.

The source driver may receive a first driving voltage and a second driving voltage and outputs a data signal. The source driver in the normal driving mode may receive the first driving voltage and the second driving voltage, and the source driver in the low-power driving mode may receive the second driving voltage.

A level of the second driving voltage may be uniform in the normal driving mode and the low-power driving mode.

A power consumption of the source driver may be defined as a product of the second driving voltage and a circuit current. A power consumption of the source driver in the normal driving mode may be higher than the power consumption of the source driver in the low-power driving mode.

During each of the write cycle section and the hold cycle section, the data signal may have a waveform having a level, which is changed between a first voltage level and a second voltage level higher than the first voltage level. During the standby section, the data signal may not be output from the source driver.

The blank section may further include a setup section between the hold cycle section and the standby section, and a hold section after the standby section.

The data signal may be maintained at the second voltage level during the setup section and the hold section.

At least one of a length of the setup section and a length of the hold section may be determined based on the first operating frequency.

In the low-power driving mode, the first driving voltage may not be provided to the source driver.

The display panel may be configured to operate in a first mode operating at a predetermined operating frequency or to operate in a second mode operating at a variable operating frequency. The image corresponding to the first frame may be displayed in the second mode.

The display device may further include a driving controller that controls operations of the display panel and the source driver and receives an image signal. In the second mode, the image signal may be input at a random period.

The driving controller may be configured to count a cycle of a previous frame, to count a cycle of a current frame, and to determine an end time point of the standby section by comparing a cycle count of the previous frame with a cycle count of the current frame.

According to an embodiment, a source driver includes: a first input terminal which receives a first driving voltage, a second input terminal which receives a second driving voltage, and a logic circuit which receives image data corresponding to a first frame or a second frame, where the first frame is operated at a first operating frequency and includes a write cycle section and a blank section including a standby section, and the second frame is operated at a frequency higher than the first operating frequency, and outputs a data signal. The source driver operates in a normal driving mode during the write cycle section and operates in a low-power driving mode during the standby section.

In the low-power driving mode, the first driving voltage may not be provided to the first input terminal.

A level of the second driving voltage may be uniform in the normal driving mode and the low-power driving mode.

A current flowing through the second input terminal in the normal driving mode may be greater than a current flowing through the second input terminal in the low-power driving mode.

The data signal during the write cycle section may have a level changed between a first voltage level and a second voltage level higher than the first voltage level. The data signal may not be output from the logic circuit during the standby section.

The blank section may further include a setup section between the write cycle section and the standby section, and a hold section after the standby section. The data signal may be maintained at the second voltage level during the setup section and the hold section.

At least one of a length of the setup section and a length of the hold section may be determined based on the first operating frequency.

The first frame further may further include a hold cycle section between the write cycle section and the standby section.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
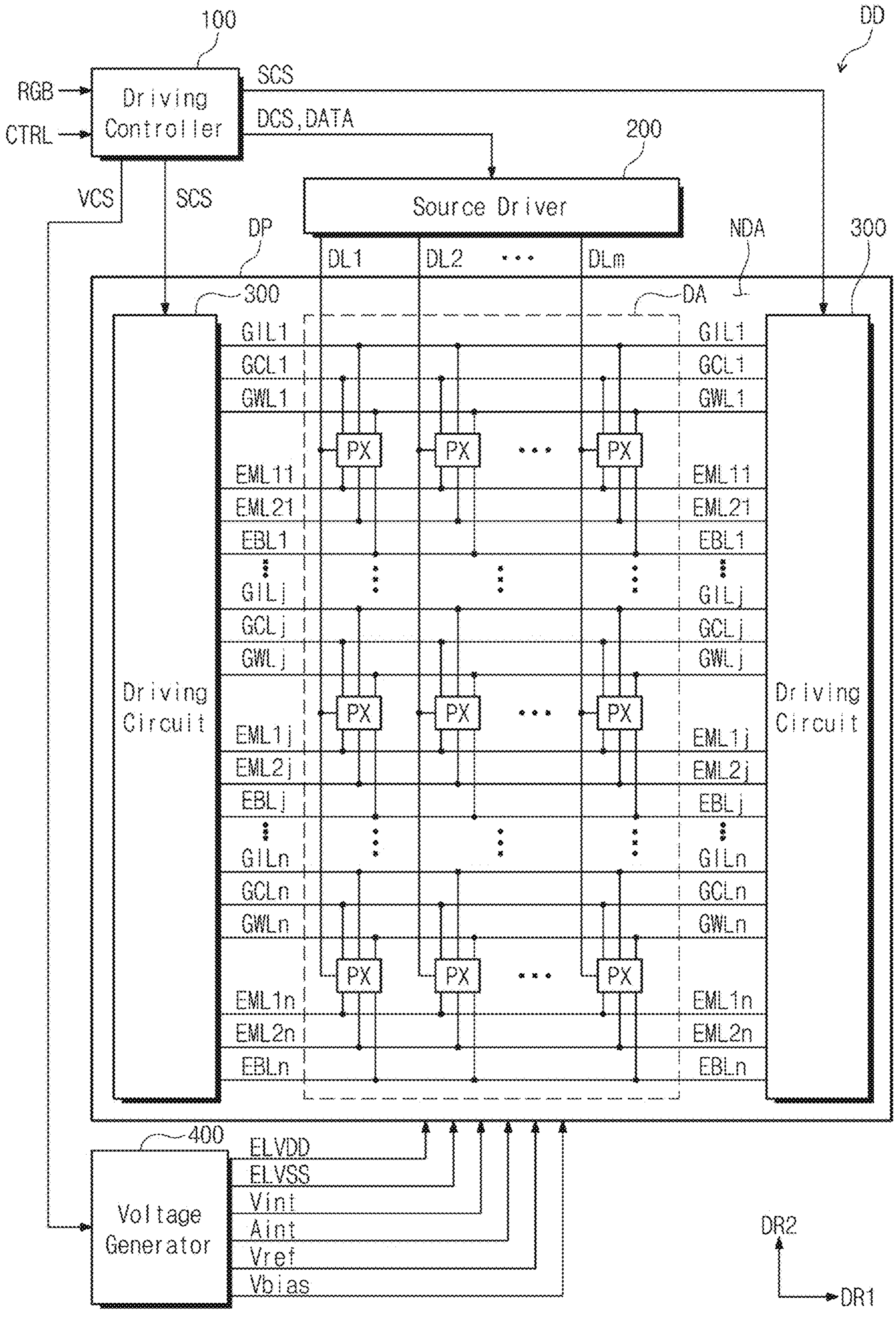
FIG. 1 is a block diagram of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device DD, according to an embodiment of the present disclosure.

Referring to FIG. 1, the display device DD may include a display panel DP, a driving controller 100, and a panel driver. As an example of the present disclosure, the panel driver may include a source driver 200 (alternatively, a data driver or a data driving circuit), driving circuits 300, and a voltage generator 400.

The display panel DP may include a display area DA and a non-display area NDA. The display panel DP may include a plurality of pixels PX arranged in the display area DA. Each of the plurality of pixels PX includes a light emitting element and a pixel circuit for controlling the emission of the light emitting element. The pixel circuit may include one or more transistors and one or more capacitors.

The display panel DP may further include initialization scan lines GIL1 to GILn, compensation scan lines GCL1 to GCLn, write scan lines GWL1 to GWLn, bias scan lines EBL1 to EBLn, first emission control lines EML11 to EML**1*n*, second emission control lines EML21 to EML2*n*, and data lines DL1** to DLm.

The display panel DP may be configured to operate in a first mode operating at a predetermined operating frequency (e.g., 60 Hz, 120 Hz, or 240 Hz) or a second mode operating at a variable operating frequency. For example, the variable operating frequency may be variously modified within a range of 1 Hz to 240 Hz. Ranges of the predetermined operating frequency and the variable operating frequency are not particularly limited to the above-described examples.

The driving controller 100 receives an image signal RGB and a control signal CTRL. The driving controller 100 generates image data signal DATA obtained by converting the data format of the image signal RGB to be suitable for the interface specification of the source driver 200. In the second mode (e.g., a game environment) operating at a variable operating frequency, the image signal RGB may be input at a random period. That is, the driving controller 100 may operate at a cycle to correspond to a random input frequency. For example, when the input period of the image signal RGB increases, the length of a blank section included in one frame may increase. When the input period of the image signal RGB decreases, the length of the blank section included in one frame may decrease.

The driving controller 100 may output a first control signal SCS, a second control signal DCS, and a third control signal VCS. The driving controller 100 may output the first control signal SCS to the driving circuit 300, may output the second control signal DCS to the source driver 200, and may output the third control signal VCS to the voltage generator 400.

The source driver 200 receives the second control signal DCS and the image data signal DATA from the driving controller 100. The source driver 200 converts the image data signal DATA into data signals and then outputs the data signals to the data lines DL1 to DLm. The data signals refer to analog voltages corresponding to grayscale values of the image data signal DATA. The data lines DL1 to DLm may be arranged in a first direction DR1, and each of the data lines DL1 to DLm may extend in a second direction DR2.

The driving circuit 300 may be disposed in the non-display area NDA of the display panel DP, but is not particularly limited thereto. For example, at least part of the driving circuit 300 may be disposed in the display area DA. The driving circuits 300 may include transistors formed through the same process as the pixel circuit.

The driving circuit 300 may receive the first control signal SCS, and may output scan signals or emission control signals to the initialization scan lines GIL1 to GILn, the compensation scan lines GCL1 to GCLn, the write scan lines GWL1 to GWLn, the bias scan lines EBL1 to EBLn, the first emission control lines EML11 to EML1*n*, and the second emission control lines EML21 to EML2*n*.

The plurality of driving circuits 300 may be provided. For example, the plurality of the driving circuits 300 may be spaced from each other with the display area DA interposed therebetween. The initialization scan lines GIL1 to GILn, the compensation scan lines GCL1 to GCLn, the write scan lines GWL1 to GWLn, the bias scan lines EBL1 to EBLn, the first emission control lines EML11 to EML1*n*, and the second emission control lines EML21 to EML2*n* may be electrically connected to the driving circuits 300 to receive signals from the driving circuits 300. For example, the one initialization scan line GILL the one compensation scan line GCL1, the one write scan line GWL1, the one bias scan line EBL1, the one first emission control line EML11, and the one second emission control line EML21 may receive the same signal from the two driving circuits 300. However, this is only an example. For example, one of the two driving circuits 300 illustrated in FIG. 1 may be omitted to avoid redundancy.

Each of the driving circuits 300 may include a scan driving circuit, which is connected to the initialization scan lines GIL1 to GILn, the compensation scan lines GCL1 to GCLn, the write scan lines GWL1 to GWLn, and the bias scan lines EBL1 to EBLn, and an emission control driving circuit, which is connected to the first emission control lines EML11 to EMLln and the second emission control lines EML21 to EML2*n*.

The initialization scan lines GIL1 to GILn, the compensation scan lines GCL1 to GCLn, the write scan lines GWL1 to GWLn, the bias scan lines EBL1 to EBLn, the first emission control lines EML11 to EML1*n*, and the second emission control lines EML21 to EML2*n* may extend in a first direction DR1. The initialization scan lines GIL1 to GILn, the compensation scan lines GCL1 to GCLn, the write scan lines GWL1 to GWLn, the first emission control lines EML11 to EML1*n*, the second emission control lines EML21 to EML2*n*, and the bias scan lines EBL1 to EBLn may be spaced from each other in a second direction DR2.

Each of the plurality of pixels PX may be electrically connected to four scan lines, two emission control lines, and one data line. For example, as shown in FIG. 1, a first row of pixels may be connected to the scan lines GILL GCL1, GWL1, and EBL1 and the first and second emission control lines EML11 and EML21. A first column of pixels may be connected to the data line DL1. Furthermore, a j-th row of pixels may be connected to the scan lines GILj, GCLj, GWLj, and EBLj and the first and second emission control lines EML1*j* and EML2*j*.

The voltage generator 400 receives the third control signal VCS and generates voltages for an operation of the display panel DP. In an embodiment, the voltage generator 400 may generate a first power supply voltage ELVDD, a second power supply voltage ELVSS, a first initialization voltage Vint, a second initialization voltage Aint, a reference voltage Vref, and a bias voltage Vbias.

Figure 2:
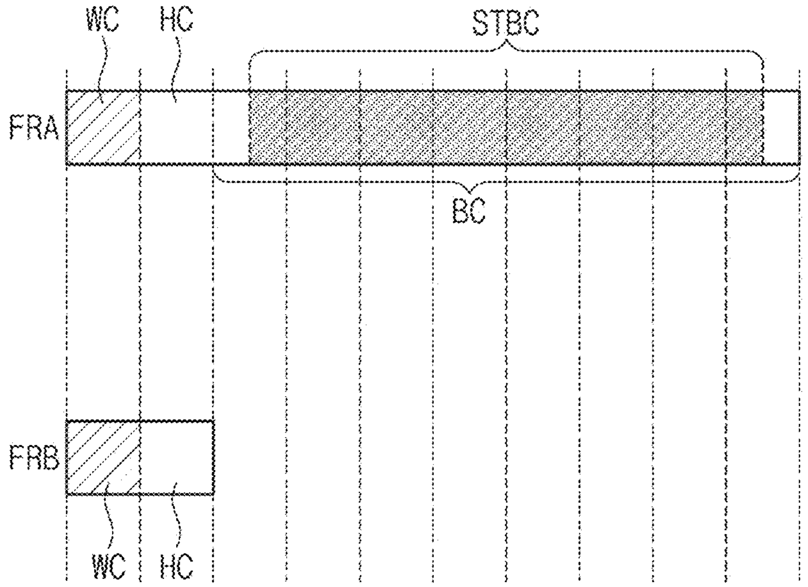
FIG. 2 is a diagram illustrating cycles included in each of a first frame and a second frame, according to an embodiment of the present disclosure.

FIG. 2 is a diagram illustrating cycles included in each of a first frame FRA and a second frame FRB, according to an embodiment of the present disclosure.

Referring to FIGS. 1 and 2, a first operating frequency of the first frame FRA may be different from a second operating frequency of the second frame FRB. For example, the first operating frequency of the first frame FRA shown in FIG. 2 may be lower than the second operating frequency of the second frame FRB. For example, the first operating frequency of the first frame FRA may be 48 Hz, and the second operating frequency of the second frame FRB may be 240 Hz.

Each of the first frame FRA and the second frame FRB may include a plurality of cycle sections.

The first frame FRA may include one write cycle section WC, one hold cycle section HC, and a blank section BC. It is illustrated that a length of the blank section BC corresponds to a length of 8 hold cycle sections HC. A length of the blank section BC may be increased or decreased depending on the operating frequency of the first frame FRA. For example, as the operating frequency increases, the length of the blank section BC may decrease. As the operating frequency decreases, the length of the blank section BC may increase. In the hold cycle section HC and the blank section BC, the pixel PX (see FIG. 1) may emit light corresponding to data written in the write cycle section WC.

The second frame FRB may be a frame operating at the maximum operating frequency. The second frame FRB may include the one write cycle section WC and the one hold cycle section HC.

The blank section BC may include the standby section STBC. The source driver 200 may operate in a normal driving mode during the write cycle section WC and the hold cycle section HC and may operate in a low-power driving mode during the standby section STBC. As the power consumption of the source driver 200 is reduced, the IC power consumption of the display device DD may be reduced.

In an embodiment of the present disclosure, a length of the standby section STBC may be shorter than the length of the blank section BC. In this case, even when the source driver 200 operates in the low-power driving mode during the standby section STBC, the image quality of the display panel DP may not be affected. Accordingly, the display device DD operating with low power may be provided without deterioration of display quality. In an embodiment of the present disclosure, unlike illustration shown in FIG. 2, the length of the blank section BC may be the same as the length of the standby section STBC. In this case, the IC power consumption of the display device DD may be maximally reduced.

Figure 3:
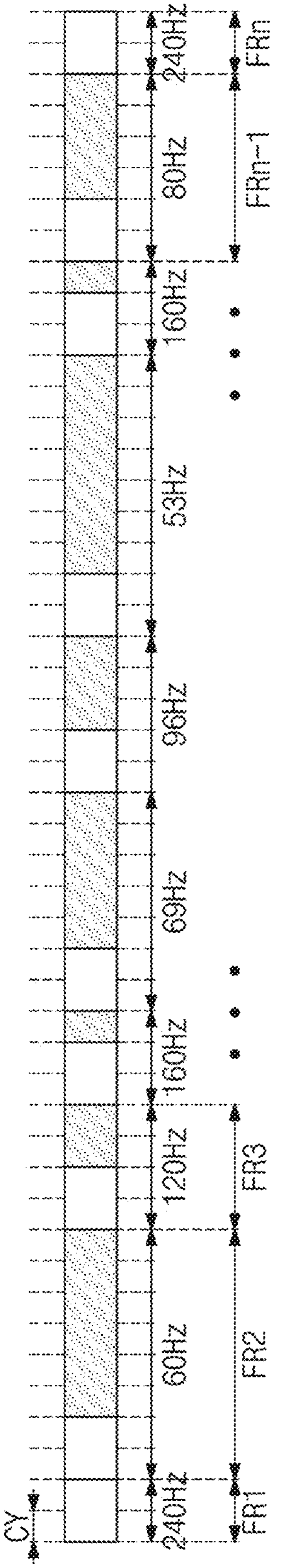
FIG. 3 is a diagram illustrating a plurality of frames in a second mode operating at a variable operating frequency, according to an embodiment of the present disclosure.

FIG. 3 is a diagram illustrating a plurality of frames in a second mode operating at a variable operating frequency, according to an embodiment of the present disclosure.

Referring to FIGS. 1 and 3, the display device DD may display images corresponding to a plurality of frames FR1 to FRn of various operating frequencies. A panel driver may drive the display panel DP corresponding to the plurality of frames FR1 to FRn thus successive. The plurality of frames FR1 to FRn may have various operating frequencies depending on the input period of the image signal RGB.

The plurality of frames FR1 to FRn may include the first frame FR1, the second frame FR2, and the third frame FR3, which are successive. For example, an operating frequency of the first frame FR1 may be 240 Hz; an operating frequency of the second frame FR2 may be 60 Hz; and an operating frequency of the third frame FR3 may be 120 Hz.

Each of the plurality of frames FR1 to FRn may include a plurality of sub-sections CY. That is, each of the plurality of frames FR1 to FRn may operate in units of sub-section. The number of sub-sections CY included in one frame may be determined based on the operating frequency of a frame. For example, the first frame FR1 may include two sub-sections CY. The second frame FR2 may include eight sub-sections CY. The third frame FR3 may include four sub-sections CY. That is, the number of sub-sections CY may be inversely proportional to the operating frequency of the corresponding frame.

The initial two sub-sections CY in each of the plurality of frames FR1 to FRn may be the write cycle section WC and the hold cycle section HC described in FIG. 2. Sections after the initial two sub-sections CY in each of the plurality of frames FR1 to FRn may be the blank section BC described in FIG. 2. The write cycle section WC may be a section in which data is written. The hold cycle section HC and the blank section BC may be sections in which the written data is held, respectively.

The frequency of the sub-section CY may be 480 Hz. The period of the sub-section CY may be about 2.08 milliseconds (ms). However, an embodiment is not particularly limited thereto. The frequency of the sub-section CY may be a frequency higher than 480 Hz or a frequency lower than 480 Hz.

The number of sub-sections CY included in one frame, a period of the corresponding frame, and the frequency of the frame may be given with reference to Table 1 below.

TABLE 1

| Number of sub-sections CY included in frame | Period of frame (ms) | Frequency of frame (Hz) |
|---|---|---|
| 2 | 4.17 | 240 |
| 3 | 6.25 | 160 |
| 4 | 8.33 | 120 |
| 5 | 10.42 | 96 |
| 6 | 12.50 | 80 |
| 7 | 14.58 | 68.57 |
| 8 | 16.67 | 60 |
| 9 | 18.75 | 53.33 |
| 10 | 20.83 | 48 |
| 11 | 22.92 | 43.64 |
| 12 | 25 | 40 |
| 13 | 27.09 | 36.92 |
| 14 | 29.17 | 34.29 |
| 15 | 31.25 | 32 |
| 16 | 33.33 | 30 |

The number of sub-sections CY included therein may vary according to the operating frequency of the frame. Accordingly, the length of the blank section BC may also be different. According to an embodiment of the present disclosure, the length of a section, in which the source driver 200 operates in the low power mode, may also be changed in response to the changing operating frequency of the frame. For example, a time in which the source driver 200 operates in a low power mode during the frame of an operating frequency of 30 Hz may be longer than a time in which the source driver 200 operates in the low-power mode during the frame of an operating frequency of 120 Hz.

Figure 4:
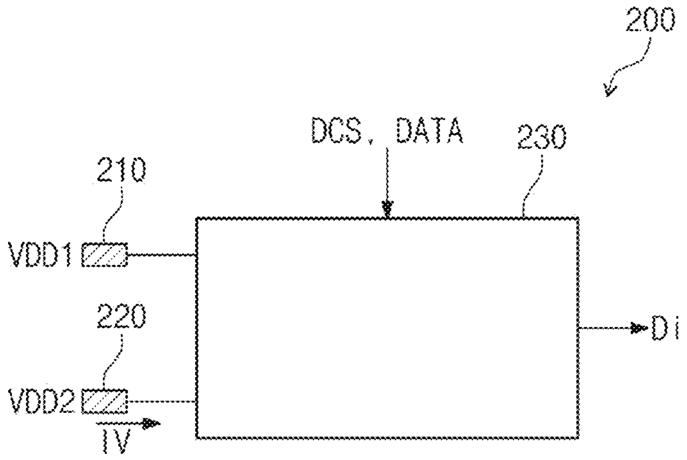
FIG. 4 is a block diagram of a source driver, according to an embodiment of the present disclosure.

FIG. 4 is a block diagram of a source driver 200, according to an embodiment of the present disclosure.

Referring to FIGS. 2 and 4, the source driver 200 may include a first input terminal 210, a second input terminal 220, and a logic circuit 230. The first input terminal 210 may receive a first driving voltage VDD1. The second input terminal 220 may receive a second driving voltage VDD2. The logic circuit 230 may be configured to receive the second control signal DCS and the image data signal DATA and to output a data signal Di.

The image data signal DATA may correspond to the first frame FRA, which operates at a first operating frequency, and includes the write cycle section WC and the blank section BC including the standby section STBC, or the second frame FRB, which operates at a frequency higher than the first operating frequency.

The source driver 200 may operate in a normal driving mode during the write cycle section WC, and may operate in a low-power driving mode during the standby section STBC. Moreover, the source driver 200 may operate in the normal driving mode during the hold cycle section HC.

In the low-power driving mode, the first driving voltage VDD1 may not be provided to the source driver 200. The first driving voltage VDD1 may be a voltage used when the image data signal DATA is delivered from a set to the source driver 200. Because the image data signal DATA is not input in the standby section STBC, the first driving voltage VDD1 may not be required. Accordingly, in a low-power driving mode, the provision of the first driving voltage VDD1 may be blocked.

The second driving voltage VDD2 may be a voltage to generate a power supply from the source driver 200. Accordingly, the second driving voltage VDD2 may be maintained at a constant voltage level in the normal driving mode and the low-power driving mode. Instead, a current IV flowing through the second input terminal 220 in the normal driving mode may be greater than the current IV flowing through the second input terminal 220 in the low-power driving mode. In other words, the power consumption of the source driver 200 may be reduced by reducing the amount of current provided to the second input terminal 220 in the standby section STBC.

The power consumption of the source driver 200 may be defined as a product of the second driving voltage VDD2 and the current IV (hereinafter "circuit current"). Accordingly, the power consumption of the source driver 200 in the normal driving mode may be higher than the power consumption of the source driver 200 in the low-power driving mode. For example, when, in the normal driving mode, the second driving voltage VDD2 is 7 volts (V), and the current IV flowing through the second input terminal 220 is 100 amperes (A), in the low-power driving mode, the second driving voltage VDD2 may be 7 V and the current IV flowing through the second input terminal 220 may be 10 A.

Figure 5:
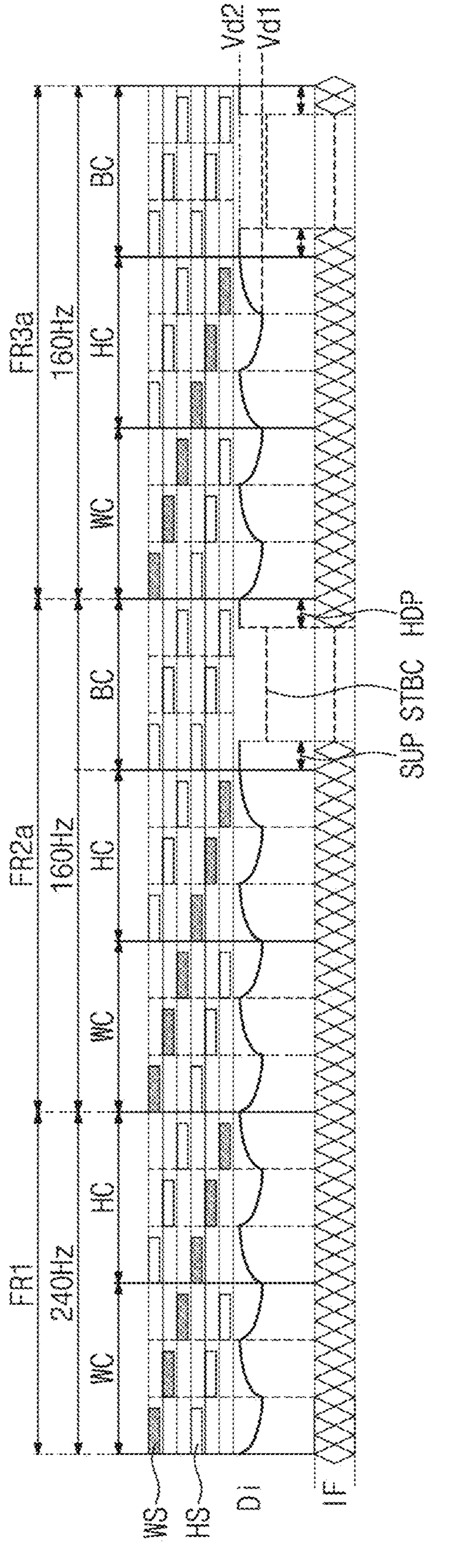
FIG. 5 is a diagram for describing an operation of a display panel in a second mode operating at a variable operating frequency, according to an embodiment of the present disclosure.

FIG. 5 is a diagram for describing an operation of a display panel in a second mode operating at a variable operating frequency, according to an embodiment of the present disclosure.

Referring to FIG. 5, first to third frames FR1, FR2*a*, and FR3*a* thus successive are illustrated. An operating frequency of the first frame FR1 may be 240 Hz. An operating frequency of each of the second frame FR2*a* and the third frame FR3*a* may be 160 Hz.

The first frame FR1 may include the write cycle section WC and the hold cycle section HC. Each of the second frame FR2*a* and the third frame FR3*a* may include the write cycle section WC, the hold cycle section HC, and the blank section BC.

FIG. 5 shows write scan blocks WS for writing data and hold scan blocks HS for holding data. The write cycle section WC and the hold cycle section HC may include both the write scan blocks WS and the hold scan blocks HS. The blank section BC may include only the hold scan blocks HS.

For example, In the write scan blocks WS, a signal may be sequentially provided to the initialization scan lines GIL1 to GILn, the compensation scan lines GCL1 to GCLn, the write scan lines GWL1 to GWLn, the bias scan lines EBL1 to EBLn, the first emission control lines EML11 to EML1*n*, and the second emission control lines EML21 to EML2*n*, which are illustrated in FIG. 1. In the hold scan blocks HS, a signal may be sequentially provided to the bias scan lines EBL1 to EBLn shown in FIG. 1.

The data signal Di may be provided in an analog form. In the write cycle section WC and the hold cycle section HC, the data signal Di may have a waveform having a level varying between a first voltage level Vd1 and a second voltage level Vd2 higher than the first voltage level Vd1.

The blank section BC may include a setup section SUP, the standby section STBC and a hold section HDP. The setup section SUP may be provided between the hold cycle section HC and the standby section STBC. The hold section HDP may be provided after the standby section STBC ends. The data signal Di may be maintained at a predetermined voltage level in the setup section SUP, and the hold section HDP. For example, the data signal Di may be maintained at the second voltage level Vd2 in the setup section SUP and the hold section HDP. During the standby section STBC, the data signal Di may not be output from the source driver 200.

During the standby section STBC, the source driver 200 (see FIG. 1) operates in a low-power driving mode. Accordingly, when the standby section STBC is entered without the setup section SUP during the blank section BC, a change in an operation mode of the source driver 200 (see FIG. 1) may affect image quality. According to an embodiment of the present disclosure, before the standby section STBC is entered, the setup section SUP is provided. After the standby section STBC ends, the hold section HDP is provided. Accordingly, the image quality influence by the source driver 200 operating in the low-power driving mode may be minimized. As a result, the display device DD (see FIG. 1) operating with low power may be provided without deterioration of display quality.

An interface signal IF may be a differential signal and may be a signal provided to the source driver 200 (see FIG. 1). A data packet of the interface signal IF may include data corresponding to the image data signal DATA (see FIG. 1). Because the data signal Di is not output from the source driver 200 in the standby section STBC, the interface signal IF may not be output during the standby section STBC.

Figure 6:
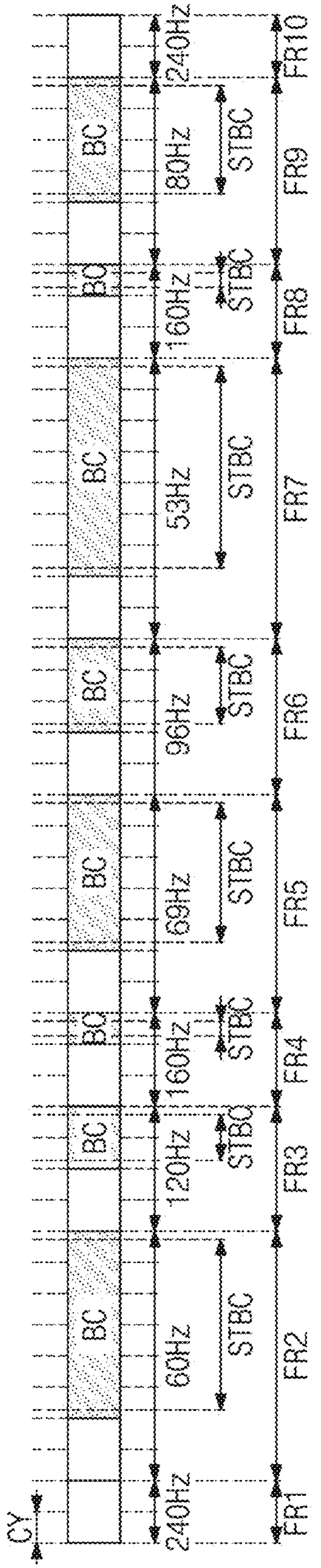
FIG. 6 is a diagram illustrating a plurality of frames in a second mode operating at a variable operating frequency, according to an embodiment of the present disclosure.

FIG. 6 is a diagram for describing an operation of a display panel in a second mode operating at a variable operating frequency, according to an embodiment of the present disclosure.

Referring to FIG. 6, a plurality of frames FR1 to FR10 are shown. In the second mode, the image signal RGB (see FIG. 1) may be input at a random period. Accordingly, an operating frequency of each of the plurality of frames FR1 to FR10 may be variable.

Each of the first frame FR1 and the tenth frame FR10 may operate at the maximum operating frequency. Accordingly, each of the first frame FR1 and the tenth frame FR10 may not include the blank section BC. The second to ninth frames FR2 to FR9 may operate at a lower operating frequency than the maximum operating frequency. Accordingly, each of the second to ninth frames FR2 to FR9 may include the blank section BC. The blank section BC may include the standby section STBC.

A length of the blank section BC may be inversely proportional to an operating frequency of each of the second to ninth frames FR2 to FR9. A length of the standby section STBC may be proportional to the length of the blank section BC. For example, an operating frequency of the second frame FR2 may be lower than an operating frequency of the third frame FR3. A length of the blank section BC of the second frame FR2 may be longer than a length of the blank section BC of the third frame FR3. In response, a length of the standby section STBC of the second frame FR2 may be longer than a length of the standby section STBC of the third frame FR3.

To reduce the image quality influence by the source driver 200 (see FIG. 1) operating in the low-power driving mode, the standby section STBC may be provided after the setup section SUP (see FIG. 5) after the blank section BC is entered. Furthermore, to secure a predetermined time until the source driver 200 (see FIG. 1) is normalized before the blank section BC is terminated, the blank section BC may be terminated after the hold section HDP (see FIG. 5) is provided. Accordingly, the length of the standby section STBC may be shorter than the length of the blank section BC.

Figure 7:
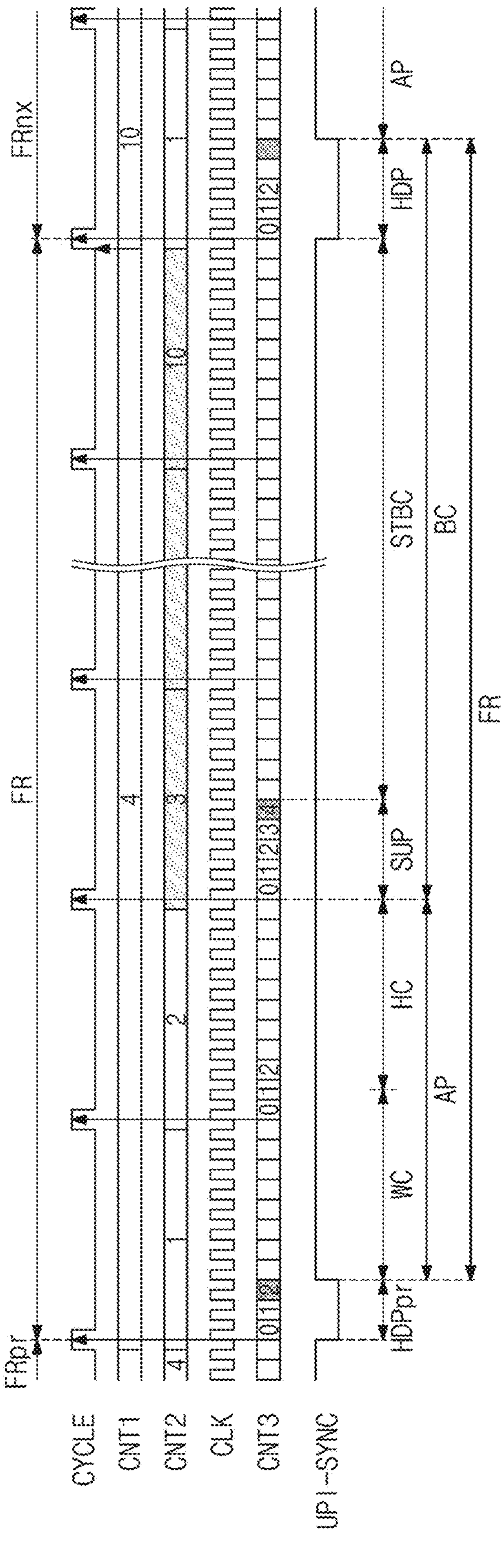
FIG. 7 is a diagram for describing an operation of a display panel in a second mode operating at a variable operating frequency, according to an embodiment of the present disclosure.

FIG. 7 is a diagram for describing an operation of a display panel in a second mode operating at a variable operating frequency, according to an embodiment of the present disclosure.

Referring to FIGS. 3 and 7, a cycle signal CYCLE, a first cycle count CNT1, a second cycle count CNT2, a clock signal CLK, a clock count CNT3, and an interface synchronization signal UPI-SYNC are shown.

The period of the cycle signal CYCLE may correspond to a period of the sub-section CY. Accordingly, the number of sub-sections CY may be counted by counting the cycle signal CYCLE. The first cycle count CNT1 may correspond to the number of sub-sections CY of a previous frame FRpr. The second cycle count CNT2 may count the sub-section CY of a current frame FR.

The first cycle count CNT1 may be updated only when the second cycle count CNT2 is 1. Accordingly, within the current frame FR, the second cycle count CNT2 may increase to correspond to the number of sub-sections CY. The first cycle count CNT1 may be maintained at a constant value. For example, the current frame FR includes the 10 sub-sections CY. That is, an operating frequency of the current frame FR may be 48 Hz. The previous frame FRpr includes the 4 sub-sections CY. That is, an operating frequency of the previous frame FRpr may be 120 Hz.

The current frame FR may include an active section AP including the write cycle section WC and the hold cycle section HC and the blank section BC including the setup section SUP, the standby section STBC, and the hold section HDP.

A frequency of the clock signal CLK may be higher than a frequency of the cycle signal CYCLE. That is, the clock signal CLK may be used to adjust a start time point of the standby section STBC and an end time point of the standby section STBC within one period of the cycle signal CYCLE. Moreover, the clock signal CLK may be used to adjust a length of the hold section HDP.

In an embodiment of the present disclosure, each of the length of the hold section HDP and the length of the setup section SUP may be changed to correspond to the operating frequency of the frame FR. For example, when the operating frequency of the frame FR is lowered, each of the length of the hold section HDP and the length of the setup section SUP may be increased. Alternatively, operating frequencies of the frame FR may be divided into predetermined groups. Each of the length of the hold section HDP and the length of the setup section SUP may have a predetermined length corresponding to a group based on a group in which the operating frequency of the frame FR is included.

In an embodiment of the present disclosure, each of the length of the hold section HDP and the length of the setup section SUP may be fixed regardless of an operating frequency of the frame FR or an operating frequency of the previous frame FRpr.

In an embodiment of the present disclosure, the length of the hold section HDP may be determined in consideration of the influence of the previous frame FRpr. For example, the first cycle count CNT1 is compared with the second cycle count CNT2, and thus a length of the hold section HDP may be determined depending on a difference between the first cycle count CNT1 and the second cycle count CNT2. The length of the hold section HDP may be determined depending on the end time point of the standby section STBC. That is, the first cycle count CNT1 is compared with the second cycle count CNT2, and thus an end time point of a standby section may be determined depending on a difference between the first cycle count CNT1 and the second cycle count CNT2.

The length of the hold section HDP may be determined depending on a difference between the operating frequency of the current frame FR and the operating frequency of the previous frame FRpr. Accordingly, the length of the hold section HDP may be determined during each frame FR. For example, the length of the hold section HDP of the current frame FR may correspond to the length of the clock count CNT3 having '4'. The length of the hold section HDPpr of the previous frame FRpr may correspond to the length of the clock count CNT3 having '2'.

When the write cycle section WC of the current frame FR is recognized, the interface synchronization signal UPI-SYNC may be transitioned to a low level. For example, a length of the hold section HDPpr of the previous frame FRpr may be adjusted within a vertical blank time of one frame time. Moreover, when the write cycle section WC of a next frame FRnx is recognized, the interface synchronization signal UPI-SYNC may be transitioned to a low level. For example, a length of the hold section HDP may be adjusted within a vertical blank time of one frame time. A vertical blank section may be about 5% of the length of one frame section. For example, the length of the vertical blank section may be greater than or equal to 460 microseconds (μs), but is not particularly limited thereto.

Figure 8:
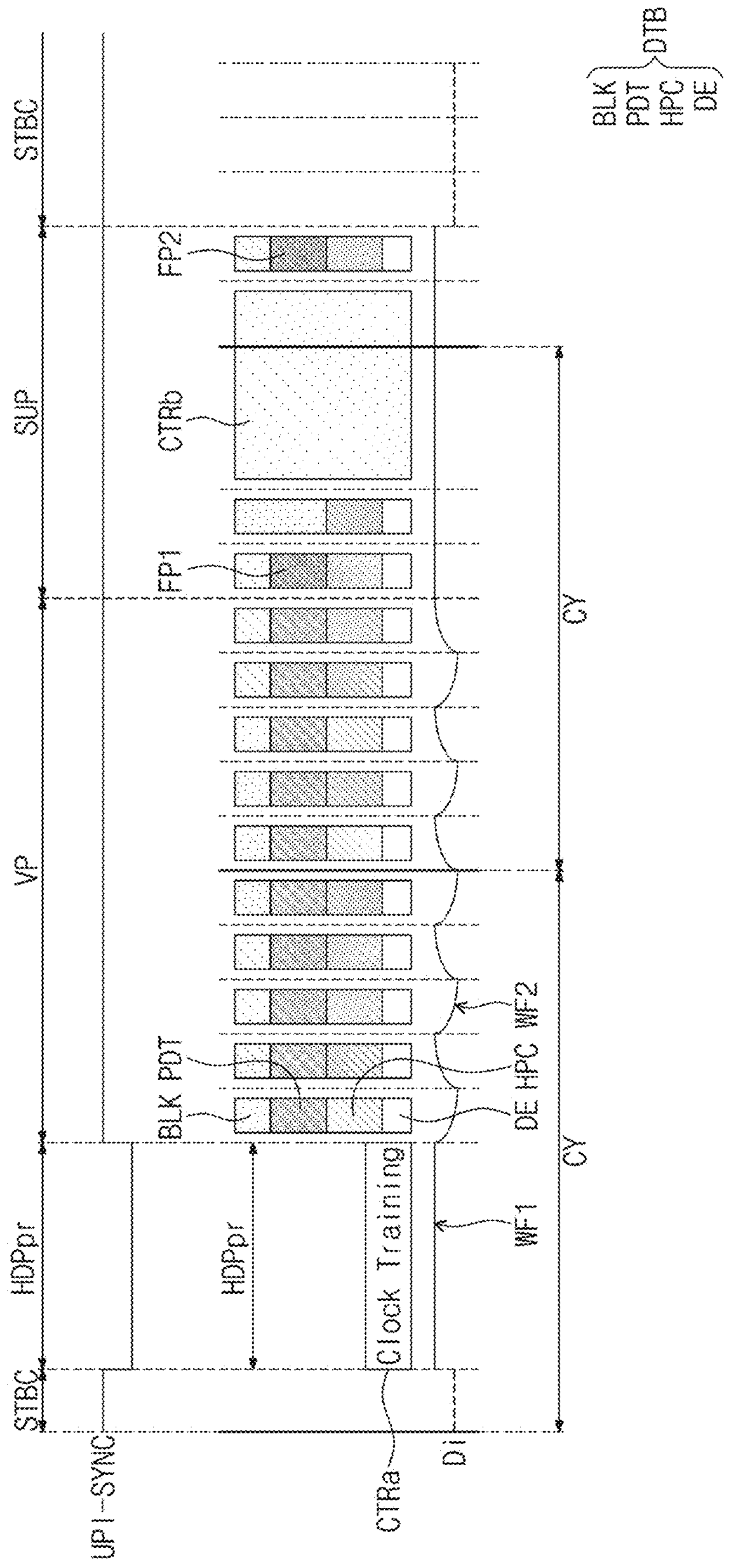
FIG. 8 is a diagram for describing an operation of one frame in a second mode operating at a variable operating frequency, according to an embodiment of the present disclosure.

FIG. 8 is a diagram for describing an operation of one frame in a second mode operating at a variable operating frequency, according to an embodiment of the present disclosure.

The boundary of the sub-sections CY shown in FIG. 8 may correspond to a cycle alignment signal. The first sub-section CY shown in FIG. 8 may correspond to a write cycle. When the write cycle is recognized (e.g., when a first cycle alignment signal is input), the interface synchronization signal UPI-SYNC may be transitioned to a low level. The length of the hold section HDPpr may be adjusted by a time point transitioning to the low level.

A section, in which the interface synchronization signal UPI-SYNC is maintained at a low level, may be a section CTRa in which a clock training operation is performed. The hold section HDPpr of the previous frame FRpr may overlap a section in which the interface synchronization signal UPI-SYNC is maintained at a low level. The start timing of the hold section HDPpr may be adjusted by using a clock counter.

A valid data section VP may be defined from a time point at which the interface synchronization signal UPI-SYNC transitions from a low level to a high level. A first waveform WF1 of the data signal Di in the hold section HDPpr may be different from a second waveform WF2 of the data signal Di in the valid data section VP. The first waveform WF1 may appear after the standby section STBC. The second waveform WF2 may appear after the first waveform WF1.

In the valid data section VP, a plurality of data blocks DTB may be provided to the source driver 200 (see FIG. 1). Each of the data blocks DTB may include an initial block DE, an H protocol HPC, a pixel data block PDT, and a blank block BLK. The initial block DE may include a block start signal. The H protocol HPC has information about a block. The pixel data block PDT may have the image data signal DATA (see FIG. 1). The blank block BLK may correspond to a dummy block without data.

After the valid data section VP, a data block including a frame protocol FP1 may be provided. The frame protocol FP1 may include gamma information and a standby command.

When the blank section BC (see FIG. 2) is recognized (e.g., when a third cycle alignment signal is input), the length of the setup section SUP may be adjusted. A section CTRb in which the clock training operation is performed may overlap the setup section SUP. A length of the setup section SUP may be adjusted by using a clock counter. When a data block including standby command activation information FP2 is provided after the section CTRb where the clock training operation is performed ends, the setup section SUP may be terminated, and the source driver 200 may enter the standby section STBC. The source driver 200 may operate in a low-power driving mode during the standby section STBC. Accordingly, the IC power consumption of the display device DD may be reduced.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, a source driver may be selectively driven in a normal driving mode or a low-power driving mode in response to an input frequency thus changed. As the power consumption of the source driver is reduced, the IC power consumption of a display device may be reduced. Moreover, a previous cycle count is compared with a current cycle count, and thus an end time point of a standby section may be determined depending on a difference between the cycles. Accordingly, even when the source driver operates in a low-power driving mode during a standby section, the image quality of a display panel may not be affected. Accordingly, the display device operating with low power may be provided without deterioration of display quality.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel configured to display an image corresponding to each of a plurality of frames; and a source driver configured to drive the display panel, wherein the plurality of frames includes a first frame operating at a first operating frequency, and a second frame operating at a frequency higher than the first operating frequency, wherein the first frame includes a write cycle section, a hold cycle section, and a blank section including a standby section, and wherein the source driver operates in a normal driving mode during the write cycle section and the hold cycle section, and operates in a low-power driving mode during the standby section.

2. The display device of claim 1, wherein the source driver receives a first driving voltage and a second driving voltage and outputs a data signal, and wherein the source driver in the normal driving mode receives the first driving voltage and the second driving voltage, and the source driver in the low-power driving mode receives the second driving voltage.

3. The display device of claim 2, wherein a level of the second driving voltage is uniform in the normal driving mode and the low-power driving mode.

4. The display device of claim 3, wherein a power consumption of the source driver is defined as a product of the second driving voltage and a circuit current, and wherein a power consumption of the source driver in the normal driving mode is higher than the power consumption of the source driver in the low-power driving mode.

5. The display device of claim 2, wherein, during each of the write cycle section and the hold cycle section, the data signal has a waveform having a level, which is changed between a first voltage level and a second voltage level higher than the first voltage level, and wherein, during the standby section, the data signal is not output from the source driver.

6. The display device of claim 5, wherein the blank section further includes a setup section between the hold cycle section and the standby section, and a hold section after the standby section.

7. The display device of claim 6, wherein the data signal is maintained at the second voltage level during the setup section and the hold section.

8. The display device of claim 6, wherein at least one of a length of the setup section and a length of the hold section is determined based on the first operating frequency.

9. The display device of claim 2, wherein, in the low-power driving mode, the first driving voltage is not provided to the source driver.

10. The display device of claim 1, wherein the display panel is configured to:

operate in a first mode operating at a predetermined operating frequency; or operate in a second mode operating at a variable operating frequency, and wherein the image corresponding to the first frame is displayed in the second mode.

11. The display device of claim 10, further comprising:

a driving controller configured to control operations of the display panel and the source driver and to receive an image signal, wherein, in the second mode, the image signal is input at a random period.

12. The display device of claim 11, wherein the driving controller is configured to:

count a cycle of a previous frame;

count a cycle of a current frame; and determine an end time point of the standby section by comparing a cycle count of the previous frame with a cycle count of the current frame.

13. A source driver comprising:

a first input terminal configured to receive a first driving voltage;

a second input terminal configured to receive a second driving voltage; and a logic circuit configured to:

receive image data corresponding to a first frame or a second frame, wherein the first frame is operated at a first operating frequency and includes a write cycle section and a blank section including a standby section, and the second frame is operated at a frequency higher than the first operating frequency; and output a data signal, wherein the source driver operates in a normal driving mode during the write cycle section and operates in a low-power driving mode during the standby section.

14. The source driver of claim 13, wherein, in the low-power driving mode, the first driving voltage is not provided to the first input terminal.

15. The source driver of claim 13, wherein a level of the second driving voltage is uniform in the normal driving mode and the low-power driving mode.

16. The source driver of claim 13, wherein a current flowing through the second input terminal in the normal driving mode is greater than a current flowing through the second input terminal in the low-power driving mode.

17. The source driver of claim 13, wherein the data signal during the write cycle section has a level changed between a first voltage level and a second voltage level higher than the first voltage level, and wherein the data signal is not output from the logic circuit during the standby section.

18. The source driver of claim 17, wherein the blank section further includes a setup section between the write cycle section and the standby section, and a hold section after the standby section, and wherein the data signal is maintained at the second voltage level during the setup section and the hold section.

19. The source driver of claim 18, wherein at least one of a length of the setup section and a length of the hold section is determined based on the first operating frequency.

20. The source driver of claim 13, wherein the first frame further includes a hold cycle section between the write cycle section and the standby section.

* * * * *